Oct. 2, 1956

H. J. HERSEY, JR 2,765,047

FILTER

Filed May 7, 1954

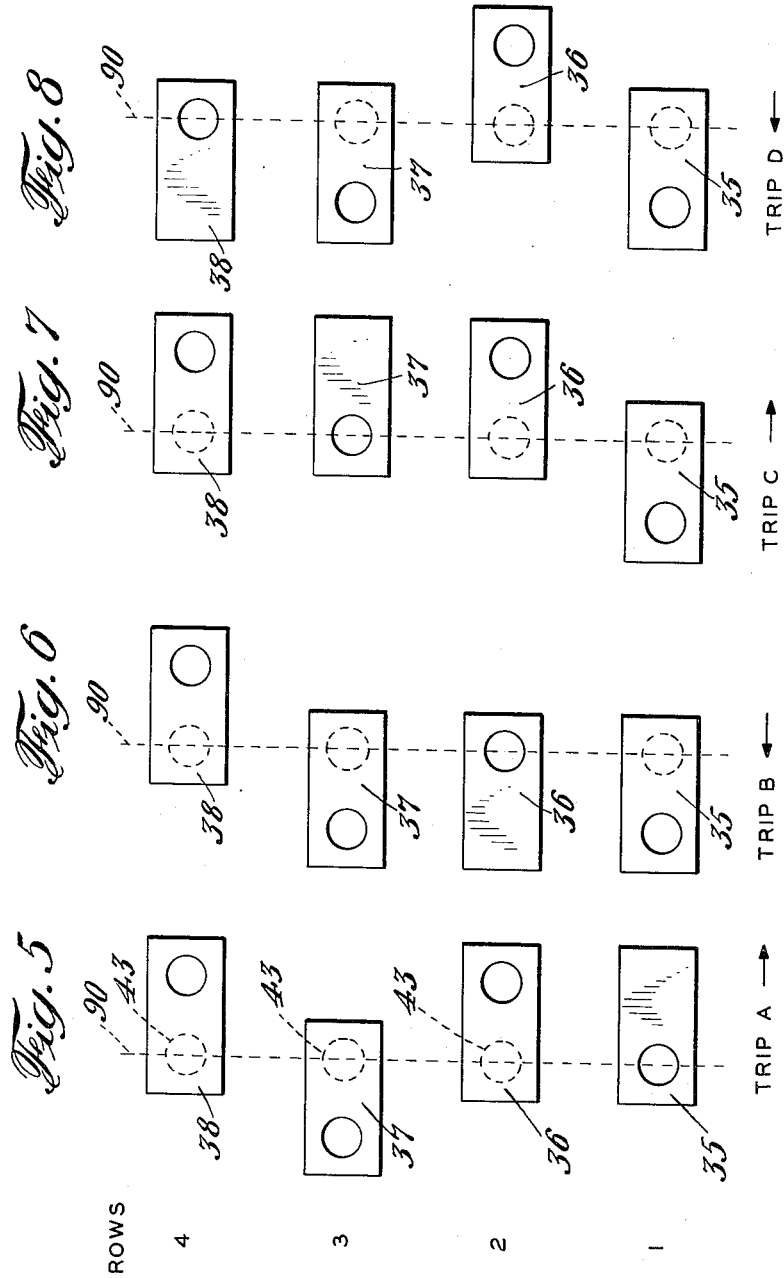

United States Patent Office 2,765,047
Patented Oct. 2, 1956

2,765,047

FILTER

Henry J. Hersey, Jr., Chatham, N. J.

Application May 7, 1954, Serial No. 428,244

15 Claims. (Cl. 183—57)

My present invention relates to apparatus for removing particles from gases in which they are entrained and more particularly to such apparatus commonly designated as dust filters utilized to remove dust from air to purify the same as well as such apparatus utilized in the recovery or removal of fine particles suspended or entrained in a gaseous atmosphere.

It is known that when a gas laden with solid particles is passed through porous filter material, the particles in time clog the pores of the filter material with a consequent reduction in capacity. As a result, it is necessary in one way or another to recondition the filter material so that the gas may pass through the same at the desired rate. It is also known that where relatively fine particles are being treated there is a serious loss in filter efficiency when new filters or improperly treated filters are utilized. This will be readily understood when it is appreciated that in the case of fine particle sizes the interstices or pores of even the best filter material presently available are large compared thereto and when a new, completely clean filter is put into service the filtration processes are relatively inefficient at first. As filtration continues, the porosity of the filter material decreases and the desired efficiency is not attained until some appreciable time after the start of the operation.

In my application Serial Number 428,243, entitled "Filter" and filed simultaneously herewith, now Patent No. 2,731,107, there is shown and described a high efficiency filter to which dust laden air, for example, may be admitted under pressure so as to force the air to pass through porous filter elements to reach an outlet on the downstream side of the filter elements. In order to maintain the porosity of filter elements in the range which provides optimum filtering capacity, the flow of gas through the filter elements is reversed as by causing a counterflow of air through each filter element against the pressure of the dust laden gas. In this way sufficient particles are removed from the filter material to maintain the desired capacity without removing particles to the extent that overcleaning results.

In practice it has been found that excessive clogging of the filter elements resulting from insufficient cleaning as well as excessive porosity from overcleaning causes inefficient operation of the filter. Furthermore, where the filter includes a plurality of filter elements it is important that none of the individual filter elements be cleaned excessively or insufficiently but are all maintained within a desired range of porosity. It has been found that one important requirement is that the filter elements be counterflowed in proper sequence. Thus, other things being equal, two filter installations may be compared. In one filter let the counterflow action progress in such a way that the filter elements just cleaned are cleaned again. For example, assuming four filter elements numbered 1-4, the counterflow sequence would then be 1, 2, 3, 4, 3, 2, 1, 2, 3, 4, 3 . . . In the second filter, also having four filter elements numbered 1-4 and in the same relative position as in the first filter, let the counterflow action follow the sequence 1, 2, 3, 4, 1, 2, 3, 4, 1 . . . Although operating under identical load, there will be a large difference in the efficiency of these two filters. In fact, it has been found that the second filter under the conditions stated will have a capacity greater by about 40% than the first filter.

Circular or cylindrical filters or arrays of filter elements facilitate counterflowing the filter elements in the proper sequence. However, in many installations a rectangular filter has several advantages. One important advantage of a filter having a rectangular shape resides in the fact that it makes maximum use of existing space. While the term "rectangular" as applied to filters specifically refers to a filter in which the filter elements are arranged in a rectangular array and are enclosed by a generally rectangular casing, it is used in a more general sense here and primarily to distinguish from generally circular or cylindrical arrays of filter elements. It is to be understood, therefore, that by rectangular filter it is intended to include arrangements of the filter elements in generally elongated courses.

It is therefore a principal object of this invention to provide a high efficiency filter generally rectangular in shape as distinguished from round filters.

A more specific object is to provide a filter having a plurality of filter elements arranged in a rectangular or elongated array with means for initiating a counterflow through each filter element in sequence so as to provide maximum capacity and efficiency.

Still other objects as well as advantages of this invention will be apparent from the following description and drawings in which:

Figures 5-8 are schematic views showing the successive relative positioning of the movable gates.

Figure 1:
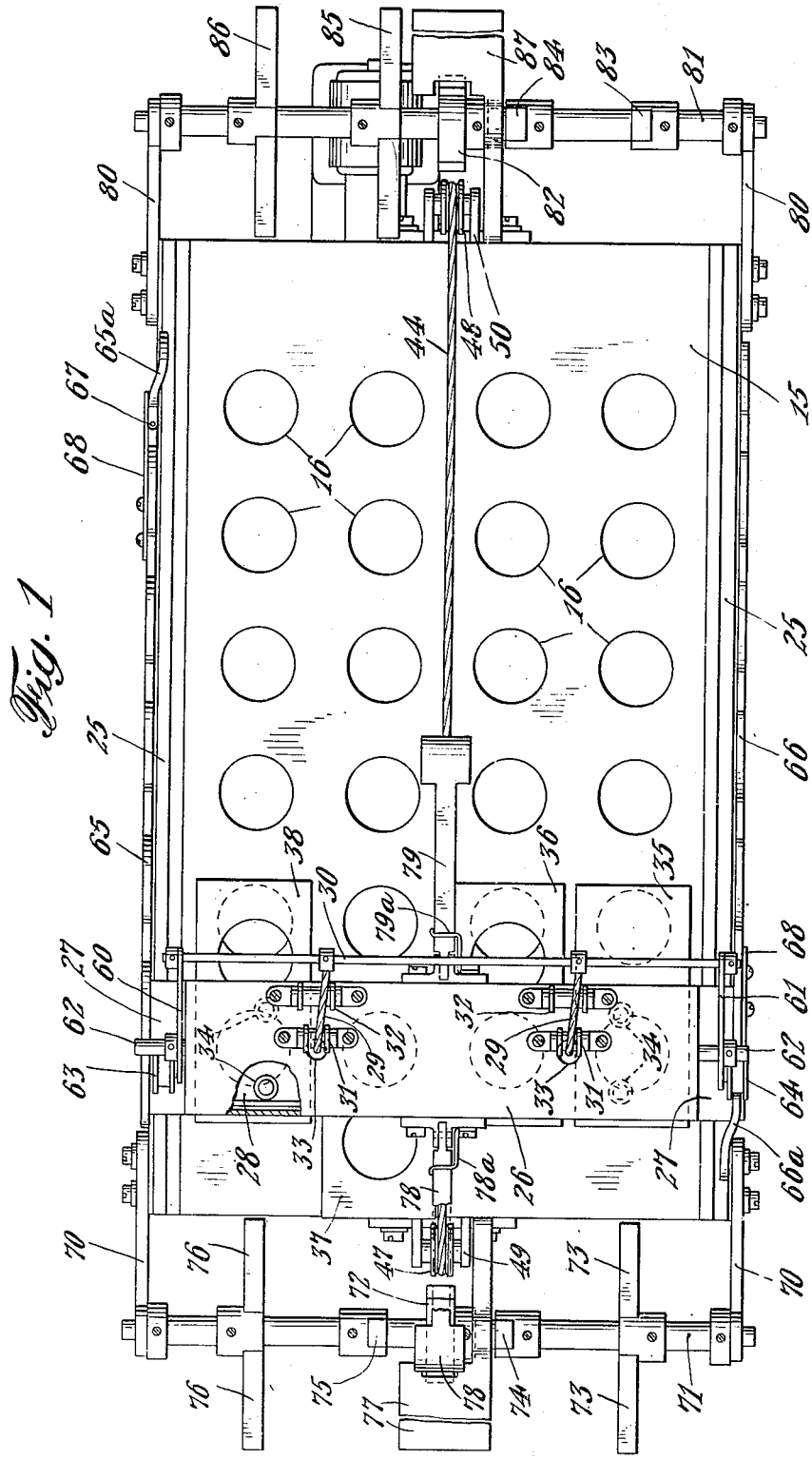
Figure 1 is a top plan view of a rectangular filter assembly constructed in accordance with the present invention.
Figure 2:
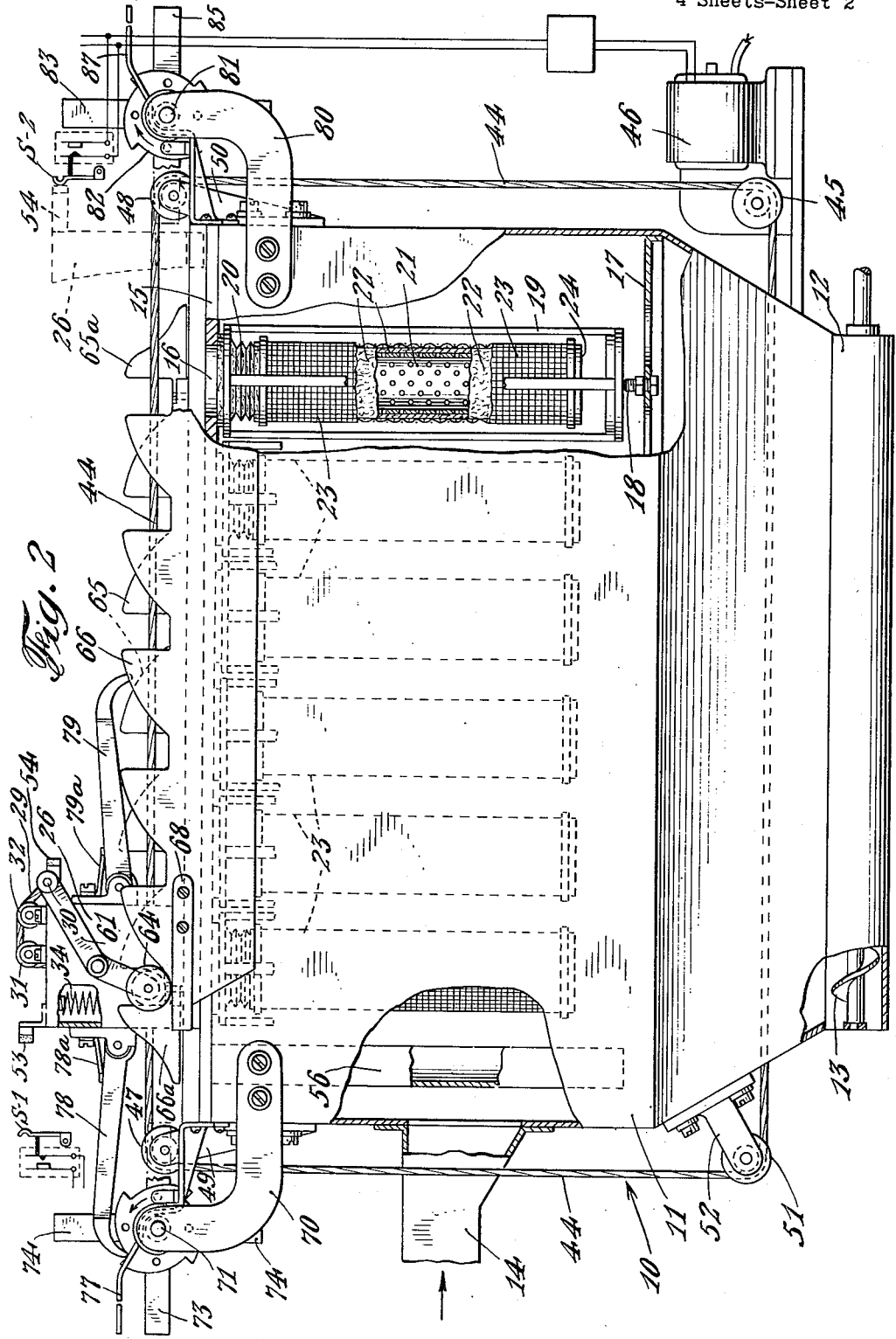
Figure 2 is a side elevational view thereof with the outer casing partially broken away for convenience.
Figure 3:
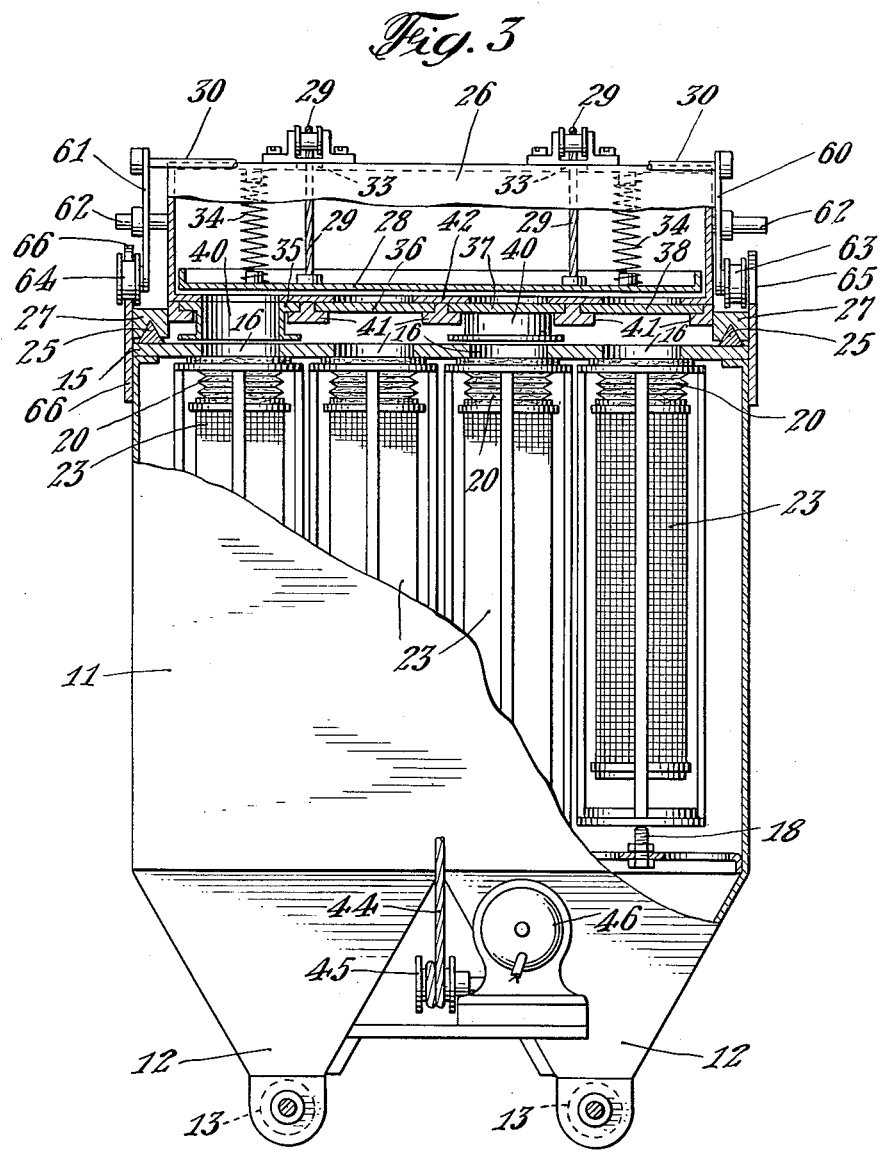
Figure 3 is an end elevational view thereof with the outer casing also partially broken away.

Referring now to the drawings in detail and to Figures 1-3 in particular, filter 10 comprises a generally rectangular casing 11 having an inlet duct 14 and is tapered inwardly at the bottom thereof to form a pair of hoppers 12 in each of which a helical conveyor 13 may be rotatably mounted, as shown. Filtered particles drop downward into each of the hoppers 12 and are removed by the conveyors 13. The upper end of casing 11 is provided with a cover plate 15 having a rectangular array of apertures 16 arranged in the present instance in four rows with six apertures in each row. An apertured support member 17 is supported in casing 11 just above hoppers 12 and carries a plurality of lock screws 18 one aligned with the center of each of the apertures 16 in cover plate 15. Lock screws 18 are each disposed to engage one end of a filter element cage 19 and urge the other end thereof into clamping engagement with the lip of one of the apertures 16. Cages 19 each comprise widely spaced members which extend in generally parallel relation, as shown. There is a cage 19 for each of the apertures 16 and each serves to engage and clampingly secure a flange formed at one end of bellows 20. To the other end of bellows 20 there is clamped a perforated or expanded metal filter element support 21 which serves to support filter element 22.

As described in said copending application, bellows 20 may be formed of any suitable material sufficiently strong and resilient to support the filter element assembly and accumulated dust load and yet normally remain collapsed, On the other hand, when the bellows is located at the lower end of the filter assembly it should normally remain extended under full load. Suitable filter materials include such materials as matted glass, asbestos fibres, as well as others. When additional support is required for the filter element 22, the filter material may be held in place by a wire screen 23 or the like. The lower end of each of the filter elements is closed by a metal disc 24 which may be part of the filter element supports 21.

Gas or air laden with particles is led into filter 10 through inlet duct 14 under pressure and due to the pressure differential across the filter normally passes through filter elements 22 where the particles are trapped. An elongated baffle member 56 generally V-shaped in cross-section is mounted vertically, as seen in Figure 2, in the space between inlet 14 and the filter elements nearest thereto so as to prevent these elements from receiving a disproportionate share of the particles from the laden air. Baffle member 56 serves to deflect the laden air as it enters casing 11 through inlet duct 14 to either side thereby insuring a more equal distribution. The interior or downstream side of each of the filter elements 22 communicates with one of the apertures 16 formed in cover plate 15. The filtered gas or air may, as in the present instance, pass through apertures 16 into the atmosphere or an outlet duct may be provided with which each of the filter elements communicates through apertures 16.

When a filter is first put into operation with clean filter elements and under average load conditions, its operation is initially characterized by an efficiency substantially below that required or desired. That is to say, that at first the finer particles are not all trapped by the filter but an undesirably large proportion thereof passes through the filter material and escapes with the supposedly filtered air. Initially, operation of the filter results in a reduction of the porosity of the filter material to the extent that the finer particles become deposited and the filter reaches optimum efficiency. However, as the operation continues a point is reached where the capacity of the filter drops off due to excessive clogging of the filter elements and there is a concomitant increase of the pressure drop across the filter.

It is therefore evident that for optimum filter capacity and efficiency there is a desired range of filter element porosity. Furthermore, if the porosity is too great, the finer particles are not trapped at all, while if too little, the capacity of the filter becomes so low as to be objectionable. In said copending application there is described and claimed apparatus for causing a counterflow of air through the entirety of each filter element in turn. The counterflow takes place through each filter element from its downstream side to its upstream side and against the pressure of the fluid being filtered. The intensity and periodicity of the counterflow is controlled so that the desired range of filter element porosity is maintained.

Apparatus for initiating a counterflow through each of a rectangular array of filter elements so as to provide optimum filter efficiency will now be described in detail. As viewed in the drawings, the upwardly presented surface of cover plate 15 has a pair of spaced apart longitudinally extending guideways 25 mounted thereon. A rectangular enclosure or boxlike member 26 is slidably mounted above cover plate 15 by means of longitudinal guide members 27 connected thereto and engaging guideways 25. An elongated plunger 28 is mounted in enclosure 26 and has connected thereto a pair of spaced wire ropes 29 each of which extends through openings in the top of enclosure 26 and are connected to an elongated connector rod 30. As will be more fully pointed out, that portion of wires 29 extending outwardly of enclosure 26 is displaced laterally to some extent during operation. To permit this displacement and at the same time provide effective guides for that part of wire rope 29, suitable rollers are provided. A pair of rollers 31 is mounted adjacent the apertures 33 through which wire ropes 29 emerge from enclosure 26. Adjacent the edge of the upper surface of enclosure 26 nearest connector rod 30 there is mounted a pair of rollers 32 each of which is respectively aligned with the rollers 31. It will be noted that rollers 32 extend transversely of wire ropes 29 a sufficient extent to permit lateral displacement of each of the ropes 29 and, in the present instance, are somewhat longer than rollers 31.

As most clearly shown in Figure 3, plunger 28 is substantially coextensive with the interior dimensions of enclosure 26. Four coil springs 34 have their upper ends abutting against the upper surface of enclosure 26 while the lower ends engage plunger 28. As will be more fully explained, when plunger 28 is drawn up by means of wire ropes 29, coil springs 34 are compressed. Then, when wire ropes 29 are released, springs 34 forcibly urge plunger 28 downward.

Figure 4:
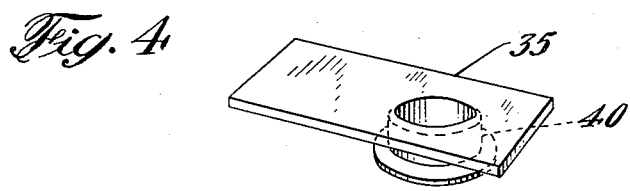
Figure 4 is a perspective view of one of the movable gates or slide members.

Since there are four rows of filter elements in filter 10, enclosure 26 has slidably mounted thereon four movable slides or gates 35—38. One convenient form which the movable slides or gates 35—38 may take is best shown in Figure 4. Each of the movable slides may be of similar construction and are elongated plate-like members in effect divided into two parts. One half of each slide member is an impervious blank while an aperture corresponding substantially to the apertures 16 formed in cover plate 15 is formed in the other half of each movable slide member 35—38. As shown in connection with slide member 35 in Figure 4, each of the slide members has connected thereto a collar-like member 40 which is flanged and which serves to guide the counterflow of air to the various filter elements, as will be more fully described. As shown most clearly in Figure 3, guideways are formed by rails 41 connected to the base or floor 42 of enclosure 26 on the side thereof presented toward cover plate 15. In these guideways are mounted the movable slide members 35—38 in side by side relation and with flanged collar-like members 40 extending toward and in close proximity to cover plate 15. Floor 42 of enclosure 26 has a plurality of apertures 43 formed therein, one for each row of filter elements 22. In the present instance, apertures 43 are round and, as shown most clearly in Figure 3, have substantially the same diameter as collar-like members 40 and apertures 16 which also correspond to the transverse diameter of the filter elements 22.

As has been pointed out, slide members 35—38 each have a blank portion and an apertured portion. Referring now to Figures 1 and 5, it is apparent that movable slide members 35—38 are mounted in alternating relation with respect to the position of the apertures formed therein. Slide members 35 and 37 are positioned with their apertures to the left of their centers, as viewed, while slide members 36 and 38 are positioned with their apertures to the right. For convenience, the rows of filter elements may be referred to as rows 1–4 from bottom to top, as viewed in Figure 1. Slide members 35—38 are correspondingly arranged in Figures 5–8. It will be noted that the relative positions of the slide members 35—38 in Figure 5 correspond to that shown in Figure 1. It should also be noted that apertures 43 formed in the floor 42 of enclosure 26 are each aligned with one of the rows 1–4. It is evident that when wire ropes 29 are released to permit the compressed coil springs 34 to expand, plunger 28 is forcibly driven downward inside of enclosure 26 causing a relatively large volume of air to be forced through such aperture 43 as may be open and into and through the filter element in communication therewith.

Propelling means are provided for moving enclosure 26 on its guideways 25 back and forth on casing 11 over cover plate 15. In the present embodiment, the propelling means comprises an endless cable 44 having several turns on drum 45 which is mounted on the slow speed shaft of a reversible gear motor 46 connected to a suitable source of power. Guide rollers 47, 48 are each mounted on suitable support members 49, 50, respectively, adjacent opposite ends of cover plate 15 on casing 11. Yet another guide roller 51 is rotatably mounted by means of support member 52 aligned vertically with roller 47 and horizontally with drum 45 to complete a closed course for cable 44 which is maintained relatively taut. A pair of switch actuators 53, 54 are mounted on opposite sides of enclosure 26 so as to engage respectively switch S-1 and switch S-2 which are mounted on casing 11 adjacent opposite ends of the path along which enclosure 26 is propelled. When enclosure 26 reaches the right-hand end of its travel, as viewed in Figure 2, actuator 54 engages switch S-2 to reverse motor 46 and cable 44 to move enclosure 26 toward the left along the path formed by its guideways 25. When enclosure 26 reaches the left-hand end of its travel, actuator 53 is so positioned on enclosure 26 as to trip switch S-1 and again reverse motor 46 and cable 44.

It is apparent that with motor 46 energized, enclosure 26 is propelled repeatedly back and forth along its pathway which extends over the length of cover plate 15. Furthermore, since each of the apertures 43 is aligned with one of the rows of filter elements, each aperture 43 passes back and forth along its corresponding row of filter elements due to the aforementioned movement of enclosure 26. As will be more fully pointed out, slide actuating means are provided in the present instance to position slide members 35—38 in such manner as to permit only one of the apertures 43 in enclosure 26 to communicate with its row of apertures 16 and corresponding row of filter elements 22 during a given trip of enclosure 26 along its path. It will be seen that each row of filter elements is counterflowed in succession, as is each filter element in each row. When the last filter element in the last row has been counterflowed, the operation is repeated, starting with the first filter element in row 1.

Actuating means for raising plunger 28 and thereby compressing coil springs 34 includes the previously mentioned wire ropes 29 and connector rod 30, the latter being rocked by lever members 60, 61 connected to opposite ends thereof. Lever members 60, 61 are each rotatably mounted intermediate the ends thereof on bearings 62 supported on opposite end walls of enclosure 26. The lower or free ends of the lever arms 60, 61 have flanged rollers 63, 64 respectively mounted thereon. Tracks 65, 66 are similar sawtooth tracks but opposite in direction and are each mounted on opposite sides of casing 11 substantially parallel with guideways 25 which define the path traveled by enclosure 26. As is perhaps best shown in Figure 3, connector rod 30, which serves to space lever arms 60, 61, is of such length that only one of the flanged rollers 63, 64 can at one time engage its corresponding track 65 or 66. Flanged rollers 63, 64 have relatively wide flanges forming deep races about the rollers so that they readily follow their respective sawtooth tracks 65, 66 and do not lose contact therewith even when dropping down the substantially vertical portions thereof. Bearings 62 are each sufficiently long to permit lever arms 60, 61 to slide sideways or laterally thereon. As shown most clearly in Figure 1, the right-hand end portion 65a of track 65 is bent or curved inward toward track 66. Similarly, the left-hand end portion 66a of track 66 is curved inward toward track 65. Each of the end portions 65a and 66a is hingedly connected, as at 67 (Figure 1), to tracks 65, 66, respectively, so that each may be deflected outwardly against a flat spring 68 which normally maintains each of the end portions 65a, 66a in its inward position. Still with reference to Figure 1, it is apparent that as enclosure 26 continues its travel to the right to complete its traverse, roller 63 engages the curved end portion 65a of track 65 and deflects the same outwardly thereby clearing its path. This is the case since roller 64 is in engagement with and constrained to follow the right-hand end portion of track 66.

When enclosure 26 has reached its extreme right-hand position, roller 63 is to the right of end portion 65a which is now free to return to its original position under the influence of spring 68. Thus, when enclosure 26 starts its movement to the left, end portion 65a extends into the path of roller 63 and the roller engages the same. From Figures 1 and 2 it is apparent that the part of end portion 65a first engaged by roller 63 extends parallel to the end of track 66 and has an inclined surface which raises roller 63 high enough to rotate connector rod 30 and lever arm 61 to carry roller 64 up off track 66 and out of engagement therewith. As enclosure 26 continues to move to the left, roller 63 encounters and follows the curved part of portion 65a and the assembly which includes connector rod 30, lever arms 60, 61, and roller 64 is shifted laterally on bearings 62 so as to position roller 64 inwardly of track 66. The corresponding position of roller 63 inwardly of track 65 is shown in Figure 1. When enclosure 26 reaches the left-hand end of its path, the foregoing is repeated but this time roller 64 deflects end portion 66a outwardly. Then, when the direction of movement of enclosure 26 is once again reversed, roller 64 is in position to engage and ride on end portion 66a thereby raising and shifting roller 63 out of engagement with track 65.

As enclosure 26 is propelled back and forth along its path, one or the other of rollers 63, 64, is in engagement with its sawtooth track. Referring to the transverse array of filter elements as lines of which there are six, it is apparent that as enclosure 26 is moved along its path from line to line toward the right, as viewed in Figure 2, and toward the viewer, as in Figure 3, roller 64 travels along sawtooth track 66, riding up a curved portion thereof and reaching a vertical drop portion as enclosure 26 becomes centered over a line of filter elements. The upward movement of roller 64 rotates the end of lever 61 connected to connector rod 30 downward since it is pivoted on one of the bushings 62. The weight arm and power arm of lever 61 are so proportioned that when roller 64 reaches its uppermost position, connector rod 30 has swung down sufficiently to raise completely plunger 28 by drawing out wire ropes 29 and thereby compressing coil springs 34. Continued movement of enclosure 26 brings roller 64 to the vertical portion of track 66 aligned with the line of filter elements referred to and roller 64 is free to drop. Therefore, coil springs 34, being free to expand, rapidly force plunger 28 downward causing a counterflow of air to be forced through the filter element whose interior is then in communication with the interior of enclosure 26. The apparatus is shown in Figures 1-3 with enclosure 26 over the first or left-hand line of filter elements and with the first filter element in row 1 in communication with enclosure 26.

The gate or slide member actuating means which directs the counterflow to each filter element in proper sequence will now be described in greater detail. Referring now to Figures 1 and 2, a pair of brackets or support members 70 are secured to casing 11 so as to rotatably support a shaft 71 adjacent to the left-hand end of the path traversed by enclosure 26. Fixed to shaft 71 is a ratchet 72 having four teeth each spaced apart circumferentially a distance corresponding to one quarter turn or 90 degrees of rotation of shaft 71. Also fixed to shaft 71 and rotatable therewith are four sets of arms 73—76. As shown, each set of arms may extend outwardly from a central hub which may be fixed to shaft 71 by means of a set screw or the like. Each set of arms consists of a pair each of which extends from opposite sides of their common hub so as to form a straight angle. The axis of each set of arms is located substantially on a line joining the center of one of the rows of filter elements and the movable slides or gates 35—38 associated therewith. Arms 73 and arms 76 are parallel and are aligned with slides 35 and 38, respectively. Arms 74 and arms 75 are also parallel and are aligned with slides 36 and 37, respectively. It is to be noted that when the sets of arms 73 and 76 are horizontal, arms 74, 75 are vertically disposed. Similarly, when arms 73 and 76 are vertical, arms 74, 75 are horizontal. The various arms and the teeth on ratchet wheel 72 are so oriented one with the other that when a tooth is aligned with a pawl guide member 77 mounted on casing 11 and extending adjacent ratchet wheel 72, arms are presented toward slides 35, 38 or toward slides 36, 37.

Mounted on enclosure 26 and movable therewith is an elongated pawl 78 which is pivotally mounted. Pawl 78 is in alignment with and extends toward ratchet wheel 72 sufficiently far so as to insure that as enclosure 26 advances toward ratchet wheel 72 and shaft 71, the latter are rotated 90 degrees before any projecting slide members may contact arms extending toward the same. Pawl 78 is biased downwardly by a spring 78a secured to enclosure 26. The various arms form a means for moving slide members relative to enclosure 26 as the enclosure nears switch S–1 and before switch S–1 is tripped and the direction of enclosure 26 reversed.

Enclosure 26 also carries an elongated pawl 79 similar to pawl 78 but extending in the opposite direction. Thus, pawl 79 extends toward the right-hand end of filter 10, as viewed in Figures 1 and 2, where a shaft 81 is rotatably supported on brackets 80 conected to casing 11. A ratchet wheel 82 is fixed to shaft 81 and is aligned with pawl 79. Shaft 81 has fixed thereto four sets of arms 83—86 which, while similar to those mounted on shaft 71, are arranged differently. Arms 83, 84, aligned with slide members 35, 36, are in parallel relation. Arms 85, 86 are aligned with slides 37, 38 and are perpendicular to arms 83, 84. A pawl guide member 87 similar to guide member 77 is connected to casing 11 and extends adjacent to ratchet wheel 82, as was previously described in connection with ratchet wheel 72. The various arms on shaft 81 and the teeth on ratchet wheel 82 are oriented one with the other in such manner that when a tooth is aligned with pawl guide member 87, arms 83, 84 are presented toward slides 35, 36 or arms 85, 86 are presented toward slides 37, 38, as the case may be.

As shown most clearly in Figure 1, the end portions of both pawls 78, 79 are wider than and extend beyond the sides of their respective ratchet wheels 72, 82. Therefore, when a tooth of either ratchet wheel as been rotated to its proper position, that is, in alignment with an inclined portion of the adjacent pawl guide member 77 or 87, further rotation is prevented since the pawl then is engaged by the guide member and the pawl is carried upward out of engagement with the ratchet. It is to be noted that pawl 79, like pawl 78, is also biased downwardly by a spring 79a mounted on enclosure 26.

The apparatus may be put into operation in several ways. However, it will be most convenient here to discuss the operation of filter 10 with the various parts positioned as indicated in Figure 1. It will be noted that arms 73 and 76 are positioned horizontally while arms 74, 75 extend vertically. Adjacent the right-hand end of the path traversed by enclosure 26, shaft 81 is so positioned that arms 83, 84 extend vertically while arms 85, 86 are horizontal. As was previously indicated, enclosure 26 is moving along its path from left to right and, as shown most clearly in Figure 2, roller 64 has dropped down the vertical portion of track 66 aligned with line 1 of the filter elements.

Referring now to Figure 5, the relative position of slide members 35—38 with respect to each other is shown, as well as to a dashed line 90 which, in addition to showing the relative position of the centers of apertures 43 in the floor of enclosure 26, also indicates the alignment of the centers of the filter elements in line 1. It will be noted that slide members 36, 37 and 38 are so positioned that their blank portions extend between the apertures 43 in enclosure 26 on one side and the openings to the filter elements on the opposite side. On the other hand, slide member 35 is seen to be positioned with its aperture permitting communication between the interior of enclosure 26 and the interior of the filter element lying thereunder. This particular traverse of enclosure 26 along its path may be conveniently designated as trip A, as indicated in Figure 5. Since enclosure 26 is being constantly propelled by means of motor 46 and endless cable 44, roller 64 travels along track 66 to impart the desired reciprocal motion to plunger 28. Furthermore, as enclosure 26 proceeds from left to right, each of the filter elements in row 1 receives a counterflow of air in succession. As enclosure 26 approaches line 6, the right-hand line of filter elements, elongated pawl 79 engages ratchet wheel 82 rotating the same 90 degrees. This rotates shaft 81 correspondingly and serves to position arms 83 and 84 horizontally while arms 85 and 86 are now positioned vertically. Enclosure 26 continues to move to the right until it reaches the position indicated in dashed lines in Figure 1. Since slide members 35 and 36 have portions thereof projecting to the right of enclosure 26, arms 83, 84 serve to move slide members 35, 36 to the left relative to enclosure 26. Furthermore, as arms 85, 86 are now positioned vertically, the relative position of slide members 37 and 38 remains unchanged. Now when actuator 54 trips switch S–2 so as to reverse the direction of movement of enclosure 26, the slide members are positioned as shown diagrammatically in Figure 6 at the start of trip B. During trip B, enclosure 26 moves from the right end of its path toward the left end thereof. From the position of the various slide members relative to dashed line 90, it is apparent that the interior of enclosure 26 is blocked off from the openings to the filter elements in rows 1, 3 and 4, while slide member 36 is now positioned so as to present its aperture in registration with the corresponding aperture 43 in the floor of enclosure 26. Thus, during trip B the filter elements in row 2 receive a counterflow in succession as enclosure 26 moves from right to left.

As enclosure 26 approaches the left-hand end of its path, pawl 78 engages ratchet 72, rotating the same and shaft 71 90 degrees. As a consequence, arms 73 and 76 are positioned vertically while arms 74 and 75 are positioned horizontally. Therefore, as enclosure 26 reaches the end of its traverse, slide members 36 and 37, which have portions projecting to the left of enclosure 26, are engaged by the now horizontal arms 74, 75 and are slid to the right relative to enclosure 26. Therefore, when actuator 53 trips switch S–1 to again reverse the direction of movement of enclosure 26, slide members 35—38 are positioned as indicated in Figure 7 and trip C now begins as enclosure 26 once more moves toward the right. With the slide members positioned as indicated in Figure 7, the filter elements in row 3 will now come into communication with the interior of enclosure 26 and receive the counterflow, while slide members 35, 36 and 38 are positioned to block off the enclosure from the filter elements in rows 1, 2 and 4.

As trip C ends, pawl 79 once again engages ratchet 82 to rotate the same and shaft 81 90 degrees. Now arms 83 and 84 are positioned vertically while arms 85 and 86 are positioned horizontally. Thus, as actuator 54 again closes on switch S–2, slide members 37 and 38 are held stationary as enclosure 26 completes its movement to the right with a consequent movement of slide members 37 and 38 to the left relative to enclosure 26. When switch S–2 is tripped and the direction of enclosure 26 again reversed, trip D is started and the various slide members are positioned relative to dashed lines 90, as indicated in Figure 8. With the slide members thus positioned, the enclosure is blocked off from the filter elements in rows 1—3 while those in row 4 successively come into communication with the interior of enclosure 26 through the apertured slide member 38. Therefore, the filter elements in row 4 receive a counterflow in succession during the course of trip D as enclosure 26 moves from right to left.

Finally, as trip D nears completion, pawl 78 once again engages ratchet wheel 72, rotating the same and shaft 71 90 degrees. This serves once again to position arms 73 and 76 horizontally while arms 74 and 75 are positioned vertically. Therefore, as enclosure 26 reaches switch S-1, slide members 35 and 38, which now project to the left of enclosure 26, are held stationary as enclosure 26 completes its travel, thereby resulting in relative movement of slide members 35 and 38 to the right with respect to the enclosure. Therefore, at the start of the next trip, which corresponds to the previously discussed trip A, the slide members are again positioned as indicated in Figure 5 and the filter elements in row 1 come into communication with the interior of enclosure 26 through the aperture in slide member 35 and receive a counterflow in succession as the enclosure moves from left to right. At the same time, slide members 36—38 block off the enclosure from the filter elements in rows 2—4.

From the foregoing it is apparent that a filter apparatus has been provided in which filter elements though arranged in elongated courses or rows may yet be treated with a counterflow in a sequence which favors optimum operation of the device. While this invention has been described in detail in connection with a preferred embodiment thereof, other and different embodiments are contemplated which are believed to be included within the present invention. For example, though mechanical means have been illustrated and described for actuating and carrying out various functions, it is also intended to use other means such as electrically operated elements for initiating, controlling, as well as directing the sequence of the counterflow.

It is to be noted that with the present construction when the enclosure is in registration with a given line, the filter elements in that line not receiving the counterflow communicate with the outlet and the enclosure or slide members do not prevent normal operation thereof. Furthermore, the gate and setting means may, if desired, be readily arranged to permit a group of filter elements in each line to be treated simultaneously. For example, the filter elements may be counterflowed two by two in the proper sequence, as pointed out hereinabove.

It is also contemplated that in certain installations it may serve to provide means for setting the counterflow gate means at only one end of the rows of filter elements. Then the counterflow would occur during a traverse in one direction followed by a rapid return trip without counterflow. This arrangement may be used to advantage in filters the construction of which favors a short return time, as where the rows of filter elements are short in length.

It is to be understood also that the intensity of the counterflow may be controlled in order that the porosity of the filter elements may be maintained automatically within a desired range. One arrangement for so controlling a counterflow and thereby the porosity of the filter elements is described in detail in said Patent No. 2,731,107. Thus, instead of directly coupling lever arms 60, 61 with plunger 28, an adjustable clutch mechanism which is responsive to the pressure drop across the filter may be connected between plunger 28 and lever arms 60, 61. In this way the pressure drop across the filter or filter elements which is proportional to the porosity of the filter elements may control the intensity of the counterflow. Furthermore, the periodicity of the counterflow may also be controlled by providing pressure sensitive switch means responsive to the pressure drop across the filter to regulate the movement of enclosure 26 along its path.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A filter, comprising a housing, a plurality of discrete filter elements in said housing, means supporting said filter elements in said housing with the filter elements arrayed to form at least two lines in one direction and at least two parallel rows in another direction transverse to said one direction, said filter elements each having an upstream and a downstream side, means for leading a particle-laden gas under pressure into said housing on the upstream side of said filter elements, means for permitting egress of said gas on the downstream side of said filter elements, an enclosure movable along a path adjacent to said filter elements, said path extending parallel to said rows, said enclosure being adapted for registration and communication with the downstream side of said filter elements line by line, means for moving said enclosure along said path thereby successively registering said enclosure with said lines of filter elements, means including translatable means in said enclosure for causing a counterflow of gas through each of said filter elements from the downstream side thereof to the upstream side and against said pressure, gate means for each row of said filter elements and for controlling communication between said enclosure and said filter elements and movable from an open to a closed position, and setting means for selectively setting said gate means so that as said enclosure traverses its path predetermined ones of said filter elements come into communication with the interior of said enclosure.

2. A filter, comprising a housing, a plurality of discrete filter elements in said housing, means supporting said filter elements in said housing with the filter elements arrayed to form at least two lines in one direction and at least two parallel rows in another direction transverse to said one direction, said filter elements each having an upstream and a downstream side, means for leading a particle-laden gas under pressure into said housing on the upstream side of said filter element, means for permitting egress of said gas on the downstream side of said filter elements, an enclosure movable along a path adjacent to said filter elements, said path extending parallel to said rows, said enclosure being adapted for registration and communication with the downstream side of said filter elements line by line, means for moving said enclosure along said path thereby successively registering said enclosure with said lines of filter elements, means including translatable means in said enclosure for causing a counterflow of gas through each of said filter elements from the downstream side thereof to the upstream side and against said pressure, gate means for each row of said filter elements and controlling communication between said filter elements and movable from an open to a closed position, and setting means adjacent said path and actuated when said enclosure reaches predetermined parts of said path and for selectively setting said gate means so that as said enclosure traverses its path the filter elements come into communication with the interior of said enclosure in row by row sequence and with the filter elements in any given row coming into communication with said enclosure in succession.

3. A filter, comprising a housing, a plurality of discrete filter elements, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side of said filter elements, means for permitting egress of said gas on the downstream side of said filter elements, means including a translatably mounted elongated plunger for forming a counterflow of gas through all of each of said filters from the downstream side thereof to the upstream side thereof and against said pressure, and means for selectively exposing each of said filter elements to said counterflow means in a continuously advancing, nonretrograde sequence.

4. A filter, comprising a housing, a plurality of discrete filter elements, means supporting said filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through said filter elements, means for permitting egress of said gas on the downstream side of said filter elements, guide means defining a path adjacent to said filter elements and parallel to said rows, counterflow means including a movable plunger substantially coextensive with any one of said lines of filter elements for causing a counterflow of gas through all of each of said filter elements from the downstream side thereof to the upstream side thereof and against said pressure, said counterflow means engaging said guide means and being movable along said path, and means including means for moving said counter-flow means along said path for selectively exposing each of said filter elements to said counterflow means in a continuously advancing, nonretrograde sequence.

5. A filter, comprising a housing, a plurality of generally tubular filter elements open at one end, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through the walls of said filter elements and out the open ends thereof, means for permitting egress of said gas on the downstream side of said filter elements, guide means defining a path adjacent to the open ends of said filter elements and parallel to said rows, means including an elongated enclosure engaging said guide means and movable along said path and a plunger substantially coextensive with any one of said lines movably mounted in said enclosure for causing a counterflow of gas through the open end of each of said filter elements to the upstream sides thereof against said pressure, and means including means for moving said enclosure along said path for selectively putting each of said filter elements into communication with the interior of said enclosure in a continuously advancing, nonretrograde sequence.

6. A filter, comprising a housing, a plurality of generally tubular filter elements open at one end, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through the walls of said filter elements and out the open ends thereof, means for permitting egress of said gas on the downstream side of said filter elements, guide means defining a path adjacent to the open ends of said filter elements and parallel to said rows, means including an elongated enclosure extending transversely relative to said rows movable along said path and a plunger substantially coextensive with any one of said lines mounted in said enclosure for causing a counterflow of gas through the open end of each of said filter elements to the upstream side thereof against said pressure when any one of said filter elements is in communication with the interior of said enclosure, means for moving said enclosure along said path, and control means including gate means for each of said rows of filter elements and for controlling communication between the filter elements in a given line and the interior of said enclosure for putting each of said filter elements into communication with the interior of said enclosure in a continuously advancing, nonretrograde sequence.

7. A filter, comprising a housing, a plurality of generally tubular filter elements open at one end, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through the walls of said filter elements and out the open ends thereof, means for permitting egress of said gas on the downstream side of said filter elements, guide means defining a path adjacent to the open ends of said filter elements and parallel to said rows, an elongated enclosure extending transversely relative to said rows and mounted for movement along said path, said enclosure having a plurality of openings formed therein one for each of said rows and aligned for registration with said rows on the downstream side of said filter elements as said enclosure travels said path, means including translatable means in said enclosure for causing a counterflow of gas through any one of said openings into and through the filter elements in registration therewith to the upstream side thereof against said pressure, means for moving said enclosure along said path, and control means including gate means intermediate each of said openings and the row of filter elements associated therewith for controlling communication between the filter elements in a given line and the interior of said enclosure for putting each of said filter elements into communication with the interior of said enclosure.

8. A filter, comprising a housing, a plurality of generally tubular filter elements open at one end, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through the walls of said filter elements and out the open ends thereof, means for permitting egress of said gas on the downstream side of said filter elements, guide means defining a path adjacent to the open ends of said filter elements and parallel to said rows, an elongated enclosure extending transversely relative to said rows and mounted for movement along said path, said enclosure having a plurality of openings formed therein one for each of said rows and aligned for registration with said rows on the downstream side of said filter elements as said enclosure travels said path, translatable means in said enclosure for causing a counterflow of gas through any one of said openings into and through the filter elements in registration therewith to the upstream side thereof against said pressure, means for moving said enclosure along said path, means for actuating said translatable means when said enclosure is in alignment with any one of said lines of filter elements, and control means including gate means intermediate each of said openings and the row of filter elements associated therewith for controlling communication between the filter elements in a given line and the interior of said enclosure for putting each of said filter elements into communication with the interior of said enclosure.

9. A filter, comprising a housing, a plurality of generally tubular filter elements open at one end, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through the walls of said filter elements and out the open ends thereof, means for permitting egress of said gas on the downstream side of said filter elements, guide means defining a path adjacent to the open ends of said filter elements and parallel to said rows, an elongated enclosure extending transversely relative to said rows and mounted for movement along said path, said enclosure having a side thereof presented toward said rows of filter elements, said side of said enclosure having a plurality of openings formed therein one for each of said rows and aligned for registration with said rows on the downstream side of said filter elements as said enclosure travels said path, an elongated plunger reciprocally mounted in said enclosure for causing a counterflow of gas through any one of said openings into and through the filter elements in registration therewith to the upstream side thereof against said pressure, means for moving said enclosure along said path, switch means adjacent either end of said path for reversing the direction of movement of said enclosure along said path when said enclosure approaches the ends of said path, and control means including gate means intermediate each of said openings and the row of filter elements associated therewith for controlling communication between the filter elements in a given line and the interior of said enclosure for individually putting each of said filter elements into communication with the interior of said enclosure as said enclosure travels back and forth along said path.

10. A filter, comprising a housing, a plurality of generally tubular filter elements open at one end, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through the walls of said filter elements and out the open ends thereof, means for permitting egress of said gas on the downstream side of said filter elements, guide means defining a path adjacent to the open ends of said filter elements and parallel to said rows, an elongated enclosure extending transversely relative to said rows and mounted for movement along said path, said enclosure having a side thereof presented toward said rows of filter elements, said side of said enclosure having a plurality of openings formed therein one for each of said rows and aligned for registration with said rows on the downstream side of said filter elements as said enclosure travels said path, an elongated plunger reciprocally mounted in said enclosure for causing a counterflow of gas through any one of said openings into and through the filter elements in registration therewith to the upstream side thereof against said pressure, means for moving said enclosure along said path, switch means adjacent either end of said path for reversing the direction of movement of said enclosure along said path when said enclosure approaches the ends of said path, plunger actuating means including elongated actuating means extending parallel to said path for actuating said plunger when the openings in said enclosure are aligned with an one of said lines of filter elements, gate means intermediate each of said openings and the row of filter elements associated therewith for controlling communication between the filter elements in a given line and the interior of said enclosure for individually putting each of said filter elements into communication with the interior of said enclosure, and means adjacent either end of said path for setting said gate means.

11. A filter, comprising a housing, a plurality of generally tubular filter elements open at one end, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through the walls of said filter elements and out the open ends thereof, means for permitting egress of said gas on the downstream side of said filter elements, guide means defining a path adjacent to the open ends of said filter elements and parallel to said rows, an elongated enclosure extending transversely relative to said rows and mounted for movement along said path, said enclosure having a side thereof presented toward said rows of filter elements, said side of said enclosure having a plurality of openings formed therein one for each of said rows and aligned for registration with said rows on the downstream side of said filter elements as said enclosure travels said path, an elongated plunger reciprocally mounted in said enclosure for causing a counterflow of gas through any one of said openings into and through the filter elements in registration therewith to the upstream side thereof against said pressure, means for moving said enclosure along said path, switch means adjacent either end of said path for reversing the direction of movement of said enclosure along said path when said enclosure approaches the ends of said path, plunger actuating means including elongated actuating means extending parallel to said path for actuating said plunger when the openings in said enclosure are aligned with any one of said lines of filter elements, a plurality of gate members one for each of said rows and each movably mounted intermediate one of said openings in said enclosure and the row associated therewith, each of said gate members having a blank portion adapted to prevent communication between its corresponding opening in said enclosure and a filter element on the opposite side thereof, each of said gate members also having a portion with an aperture formed therethrough which when aligned with the corresponding opening in said enclosure permits communication between the interior of the enclosure and a filter element aligned therewith, and means for selectively positioning said gate members whereby each of said filter elements may be individually put into communication with the interior of said enclosure in a predetermined sequence.

12. A filter, comprising a housing, a plurality of generally tubular filter elements open at one end, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through the walls of said filter elements and out the open ends thereof, means for permitting egress of said gas on the downstream side of said filter elements, guide means defining a path adjacent to the open ends of said filter elements and parallel to said rows, and elongated enclosure extending transversely relative to said rows and mounted for movement along said path, said enclosure having a side thereof presented toward said rows of filter elements, said side of said enclosure having a plurality of openings formed therein one for each of said rows and aligned for registration with said rows on the downstream side of said filter elements as said enclosure travels said path, an elongated plunger reciprocally mounted in said enclosure for causing a counterflow of gas through any one of said openings into and through the filter elements in registration therewith to the upstream side thereof against said pressure, means for moving said enclosure along said path, switch means adjacent either end of said path for reversing the direction of movement of said enclosure along said path when said enclosure approaches the ends of said path, plunger actuating means including elongated actuating means extending parallel to said path for actuating said plunger when the openings in said enclosure are aligned with any one of said lines of filter elements, a plurality of gate members one for each of said rows and each movably mounted intermediate one of said openings in said enclosure and the row associated therewith, each of said gate members having a blank portion adapted to prevent communication between its corresponding opening in said enclosure and a filter element on the opposite side thereof, each of said gate members also having a portion with an aperture formed therethrough which when aligned with the corresponding opening in said enclosure permits communication between the interior of the enclosure and a filter element aligned therewith, a pair of shafts one rotatably mounted adjacent either end of said pair, a plurality of arms mounted on each of said shafts at least one arm being aligned with each of said rows, said arms when rotated into a predetermined position extending toward said rows and being adapted when so positioned to engage and move from one position to another said gate members, said arms extending along said path adjacent the ends thereof when in said predetermined position and so positioned relative to said switch means that said gate members may be engaged thereby as said enclosure approaches the ends of its path, and means for rotating said shafts to bring certain ones of said arms into said predetermined position whereby each of said filter elements may be individually put into communication with the interior of said enclosure in a predetermined sequence.

13. A filter as described in claim 12 wherein a ratchet is fixed to each of said shafts, a pair of elongated pawls one extending from opposite sides of said enclosure toward each end of said path and aligned with said ratchets, said pawls extending sufficiently far in advance of said enclosure as to engage said ratchets and rotate the same and their shafts a predetermined amount as said enclosure approaches the respective ends of said path.

14. A filter, comprising a housing, a plurality of generally tubular filter elements open at one end, means supporting said filter elements in spaced relation in said housing with the filter elements arrayed to form a plurality of elongated lines in one direction and a plurality of elongated parallel rows in another direction transverse to said one direction, said filter elements each having an upstream and a downstream side, means for leading a gas to be filtered into said housing under pressure on the upstream side relative to the pressure on the downstream side to cause said gas to pass through the walls of said filter elements and out the open ends thereof, means for permitting egress of said gas on the downstream side of said filter elements, guide means defining a path adjacent to the open ends of said filter elements and parallel to said rows, and elongated enclosure extending transversely relative to said rows and mounted for movement along said path, said enclosure having a side thereof presented toward said rows of filter elements, said side of said enclosure having a plurality of openings formed therein one for each of said rows and aligned for registration with said rows on the downstream side of said filter elements as said enclosure travels said path, an elongated plunger reciprocally mounted in said enclosure for causing a counterflow of gas through any one of said openings into and through the filter elements in registration therewith to the upstream side thereof against said pressure, means for moving said enclosure along said path, switch means adjacent either end of said path for reversing the direction of movement of said enclosure along said path when said enclosure approaches the ends of said path, plunger actuating means including a pair of elongated sawtooth tracks extending parallel to and on opposite sides of said path, said tracks each having a plurality of portions each corresponding to a power stroke of said plunger and so aligned relative to said lines of filter elements that said plunger power stroke occurs when the openings in said enclosure are aligned with any one of the lines of filter elements, one of said tracks being engaged and serving to control the movement of said plunger as said enclosure moves in one direction and the other of said tracks being engaged and serving to control the movement of said plunger when said enclosure moves in the other direction, gate means intermediate each of said enclosure openings and the row of filter elements associated therewith for controlling communication between the filter elements in a given line and the interior of said enclosure for individually putting each of said filter elements into communication with the interior of said enclosure, and means adjacent either end of said path for setting said gate means.

15. A filter as described in claim 14 wherein a lever arm is pivotally mounted on either end of said enclosure and is movable therewith, means interconnecting and spacing said lever arms so that when one lever arm engages its track the other lever arm is out of engagement with the other track, said lever arms being shiftable relative to said enclosure and transversely of said path, an end portion of one track and an opposite remote end portion of the other track being displaceably mounted and having a curved portion normally extending into the path of the corresponding one of said lever arms when out of engagement with its track, resilient means urging said end portions into normal position, whereby as the enclosure nears the end of one traverse the lever arm out of engagement with its track during that traverse engages and displaces the end portion of its track and then during the initial portion of the next traverse engages and follows the end portion of its track to thereby shift the other lever arm to its disengaged position.

References Cited in the file of this patent

UNITED STATES PATENTS

| 1,516,444 | Lough | Nov. 18, 1924 |
| 2,507,335 | Donohue | May 9, 1950 |
| 2,583,039 | Boesger | Jan. 22, 1952 |

FOREIGN PATENTS

| 368,731 | Great Britain | Mar. 1, 1932 |
| 521,165 | Germany | Mar. 18, 1931 |
| 875,908 | Germany | May 7, 1953 |